(12) United States Patent
Suwa (10) Patent No.: US 7,395,463 B2
(45) Date of Patent: Jul. 1, 2008

(54) ELECTRONIC APPARATUS AND WIRELESS NETWORK SYSTEM

(75) Inventor: Yutaka Suwa, Chikushino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 489 days.

(21) Appl. No.: 10/996,453

(22) Filed: Nov. 26, 2004

(65) Prior Publication Data

US 2005/0166117 A1    Jul. 28, 2005

(30) Foreign Application Priority Data

Dec. 1, 2003    (JP)    ............................. 2003-401263

(51) Int. Cl.
    H04L 1/22    (2006.01)
(52) U.S. Cl. ...................... 714/708; 375/347
(58) Field of Classification Search ................. 714/708; 375/347
    See application file for complete search history.

(56) References Cited

U.S. PATENT DOCUMENTS

| | | | | |
|---|---|---|---|---|
| 3,829,777 A * | 8/1974 | Muratani et al. ................. 455/8 |
| 5,335,356 A * | 8/1994 | Andersson ................... 455/517 |
| 5,715,297 A * | 2/1998 | Wiedeman ................... 455/427 |
| 5,764,699 A * | 6/1998 | Needham et al. ............. 375/261 |
| 6,230,015 B1 | 5/2001 | Kinnunen et al. |
| 6,314,269 B1 * | 11/2001 | Hart et al. ................... 455/12.1 |
| 6,456,606 B1 * | 9/2002 | Terasawa ..................... 370/331 |
| 6,704,301 B2 * | 3/2004 | Chari et al. .................. 370/351 |
| 6,907,244 B2 * | 6/2005 | Santhoff et al. ............. 455/442 |
| 7,024,219 B2 * | 4/2006 | Miyamoto .................. 455/522 |
| 7,075,905 B2 * | 7/2006 | Chen et al. .................. 370/318 |
| 7,079,512 B1 * | 7/2006 | Alam et al. .................. 370/331 |
| 7,245,915 B2 * | 7/2007 | Matta et al. .................. 455/436 |
| 2002/0132621 A1 | 9/2002 | Takano |
| 2003/0133422 A1 | 7/2003 | Bims |

FOREIGN PATENT DOCUMENTS

| | | |
|---|---|---|
| EP | 0645940 | 3/1995 |
| GB | 2379358 | 3/2003 |
| JP | 11225325 | 8/1999 |
| WO | 03/047176 | 6/2002 |
| WO | 03/090083 | 10/2003 |

OTHER PUBLICATIONS

German Office Action dated Jan. 9, 2008 with English translation thereof.

* cited by examiner

Primary Examiner—Stephen M. Baker
(74) Attorney, Agent, or Firm—Dickinson Wright, PLLC (57) ABSTRACT

Electronic apparatus such as a cordless phone, the electronic apparatus includes detection means for detecting the error of received data and at least two speech buffers as speech buffers for temporarily storing the received voice data. In case the electronic apparatus is in a position where it can communicate with a repeater and a base unit, the electronic apparatus stores the voice data transmitted from the base unit into one speech buffer and stores voice data transmitted from the repeater into the other speech buffer, and uses the voice data of a lower error rate. This maintains high speech quality. In case the electronic apparatus roams from a second wireless network formed around the repeater to a first wireless network formed around the base unit, smooth roaming is provided without degrading the speech quality by using the voice data of a lower error rate stored in either of the two speech buffers, even when the conversation state is gradually degraded and more errors are detected in the received data.

11 Claims, 11 Drawing Sheets

ELECTRONIC APPARATUS AND WIRELESS NETWORK SYSTEM

BACKGROUND OF THE INVENTION

1. Technical Field

The present invention relates to electronic apparatus which is connectable to a network by using a radio wave and which performs data communications, voice communications and printing, and a wireless network system including the electronic apparatus.

2. Background Art

Recently, various specifications for wireless networks have been standardized and apparatus equipped with a variety of applications has been connected to a wireless network of the same specifications. For example, Bluetooth (trademark) is a specification which allows connection of a computer, computer peripherals such as a printer, a scanner, and electronic apparatus such as a facsimile, audio apparatus, and a cordless phone, to a wireless network.

In case a cordless phone is manufactured using the Bluetooth system, a piconet may be formed using the base set as a master and handsets as slaves, and a handset can move for conversation with in a range where a radio wave can reach (coverage area).

A network using a radio wave has a limited coverage area. For a cordless phone comprising a base unit and a plurality of handsets, in case the user carrying a handset has walked out of the coverage area of the wireless network network, a radio wave from the base unit does not reach the handset, which may result in breakdown of communications.

By providing a repeater conforming to the specifications of the same wireless network in the coverage area of a wireless network and forming a wireless network around the repeater, the coverage area of the wireless network where wireless network communications are available has been expanded. With this configuration, the voice data transmitted from a handset is relayed by the repeater, which prevents breakdown of communications wile the user of the handset is traveling.

The Japanese Patent Laid-Open No. H11-225325/(1999) describes a mobile image transmitter capable of transmitting a quality image where repeaters receiving a radio wave from mobile communications apparatus for transmitting an image passes the image data received as well as field strength data and a base station displays the image coming from a repeater which has transmitted the highest field strength data.

According to the mobile image transmitter of Japanese Patent Laid-Open No. H11-225325/(1999), the field strength of the radio wave transmitted from the mobile communications apparatus is measured by the repeater and the measured result is transmitted to the base station for determination of the field strength. This requires a base station which manages all repeaters. A wireless network such as a Bluetooth-based network is composed of electronic apparatus each operating on a standalone basis, so that it cannot accommodate electronic apparatus corresponding to the base station. Therefore, it is impossible to apply the mobile communications apparatus according to Japanese Patent Laid-Open No. H11-225325/(1999) to such a wireless network.

SUMMARY OF THE INVENTION

In view of the aforementioned related art problems, the invention aims at providing electronic apparatus which can be connected to a wireless network capable of carrying out the optimum communications depending on the state of data received via a plurality of wireless network and a wireless network system comprising the electronic apparatus.

The invention provides electronic apparatus connectable to a plurality of wireless networks, characterized by comprising: communications means for communicating with other electronic apparatus connected to the plurality of wireless networks in a direct fashion or via a repeater; detection means for detecting the error of data received directly or via a repeater from the other electronic apparatus by way of the communications means; and a selector for selecting the optimum data from the data received directly or via the repeater depending on the result detected by the detection means.

This allows selection of data depending on the error detection result, which assures reliable communications.

The selector selects data based on the rate of error detected by the detection means. This allows selection of data which has lower field strength and lower error rate, which also assures reliable communications.

DETAILED DESCRIPTION OF THE PREFERRED EMBODIMENTS

Embodiments of the invention are described below referring to drawings.

Embodiment 1

The configuration of electronic apparatus connectable to a wireless network according to Embodiment 1 of the invention and a wireless network system comprising the electronic apparatus is described below based on FIGS. 1 and 2.

Figure 1:
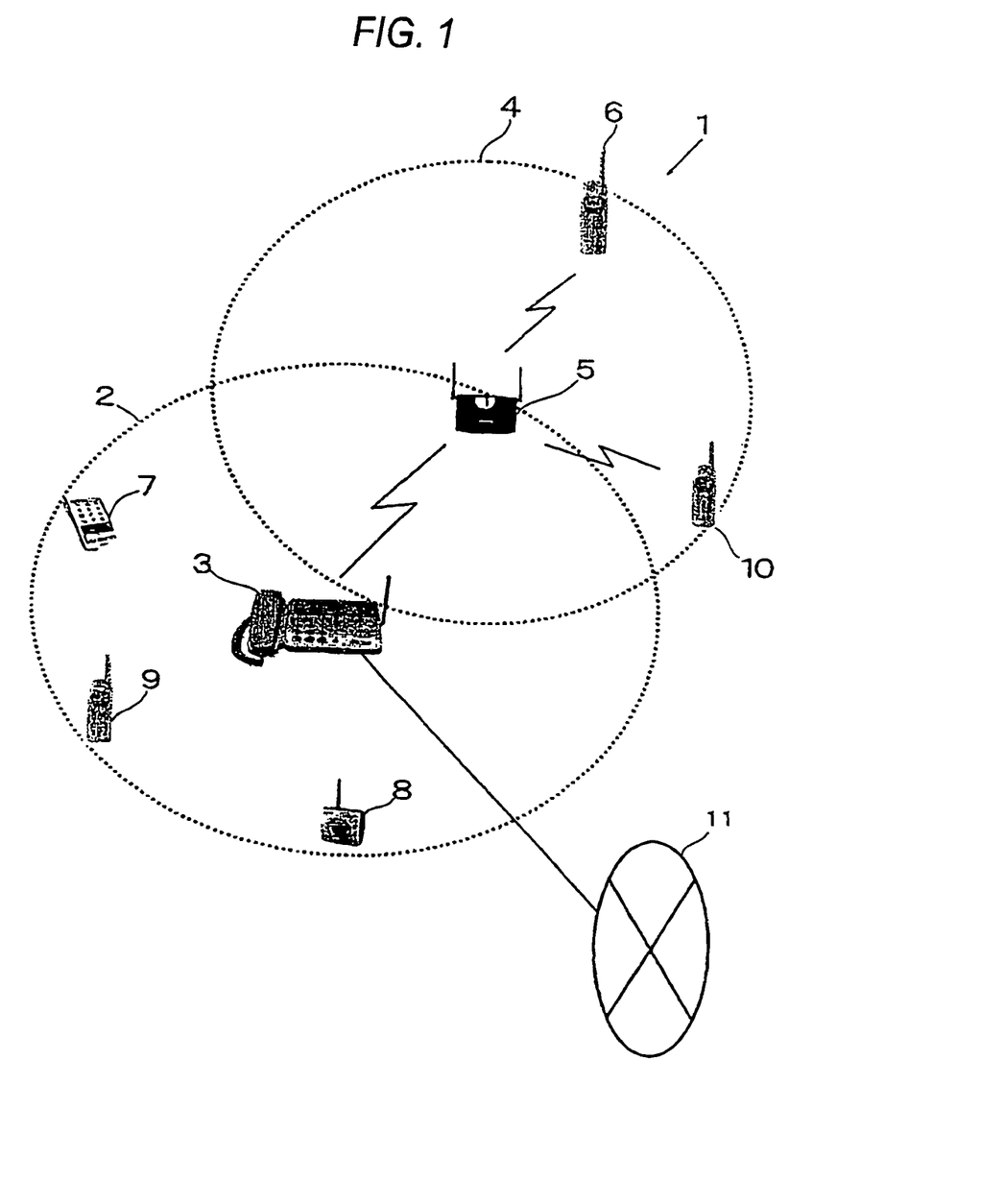
FIG. 1 shows the configuration of a wireless network system according to Embodiment 1 of the invention.

FIG. 1 shows the configuration of a wireless network system according to Embodiment 1 of the invention. FIG. 2 is a block diagram of a cordless phone as an example of electronic apparatus connectable to the wireless network according to Embodiment 1 of the invention. In the example shown in FIG. 1, a plurality of wireless networks (2, 4) are formed in a wireless network system 1.

In other words, a first wireless network 2 is formed around a base unit 3 as first communications apparatus. In the first wireless network 2, a PDA (Personal Digital Assistant) 7, a digital camera 8 equipped with communications feature, and a handset 9 of the base unit 3 perform communications as other electronic apparatus.

A repeater 5 as second communications apparatus and repeating apparatus and a handset 6 of a cordless phone as third communications apparatus to communicate with the repeater 5 form a second wireless network 4. In the second wireless network 4, a handset 10 as well as the handset 6 performs communications.

By using a transmit power of 1 mW to 100 mW, the base unit can communicate with electronic apparatus connected to the first wireless network 2 having a coverage area some 10 meters in diameter. In the example shown in FIG. 1, the base unit 3 communicates with the handset 9, the PDA 7, and the digital camera 8. The base unit 3 and these electronic apparatus communicate based on the procedure conforming to Bluetooth standard. The base unit 3 also communicates with the repeater 5 based on the Bluetooth standard. In case the handset 6 has roamed and entered a coverage area where communications with the base unit 3 is allowed, the handset 6 also joins the first wireless network 2 to start communications with the base unit 3.

The base unit 3 connects to each electronic apparatus via a wireless network as well as connects to a PSTN (Public Switched Telephone Network) 11. The base unit 3 communicates based on the same Bluetooth standard as the repeater 5.

The repeater 5 also communicates with electronic apparatus connected to the second wireless network 4 having a coverage area some 10 meters in diameter by using a transmit power of 1 mW to 100 mW. In the example shown in FIG. 1, the repeater 5 is arranged in the first wireless network 2 within the coverage area of the base unit 3 and relays the communications between the handset 6, 10 located outside the first wireless network 2 and the base unit 3. Thus, the handset 6 can communicate with the base unit 3 via the repeater 5 as long as it is located in the second wireless network of the repeater 5.

Next, the configuration of the handset 6 of the cordless phone is described below based on FIG. 2. In FIG. 2, the handset 6 communicates with electronic apparatus connected to the wireless network by way of a radio section 16 for demodulating the radio wave received from an antenna 15 and modulating the radio wave to transmit to the antenna 15. The radio section 16 uses a frequency band ranging from 2.402 GHz to 2.480 MHz called the ISM (Industry Science Medical) band to perform modulation and demodulation by way of the Binary Frequency Shift Keying system. The radio section 16 outputs a received Bluetooth-conforming packet to a synchronous correlator 17.

The synchronous correlator 17 checks the access code as the head section of a received packet to determine whether the packet belongs to the wireless network to which the handset 6 is connected. The synchronous correlator 17, determining that the received packet belongs to the wireless network to which the handset 6 is connected based on the access code, outputs the packet to a received packet analyzer 18 and analyzes the packet header as an intermediate section of the packet in the received packet analyzer 18.

The synchronous correlator 17 checks for a synchronization error in the preamble, sync word and trailer included in an access code, and in case an error is found, the synchronous correlator 17 reports the error to an error counting section 19.

A received packet analyzer 18 analyzes a common packet used to establish synchronization with electronic apparatus in a wireless network, an SCO packet used for synchronous communications of voice data, and an ACL packet used for asynchronous data communications. In case the received packet analyzer 18 determines that the received packet is an SCO packet of incoming voice data, the SCO packet is output to a voice packet processor 20. In case the received packet analyzer 18 determines that the received packet is an ACL packet, the ACL packet is output to a data packet processor 21.

The synchronous correlator 17 as error detection means checks an 8-bit cyclic redundancy check (CRC) code included in the packet header by way of the received packet analyzer 18. In case an error is found, the synchronous correlator 17 reports the error to the error counting section 19.

The data packet processor 21 separates the data stored in the payload as a final section of the ACL packet and stores the data into a data buffer 22. The data packet processor 21 also checks a 16-bit cyclic redundancy check (CRC) code included in the payload. In case an error is found, the data packet processor 21 reports the error to the error counting section 19. In case an error rate equal to or greater than a predetermined value is detected, the data packet processor 21 discards the packet.

A communications controller 23 is means for controlling the communications procedure of the handset 6 and controls the synchronous correlator 17, the received packet analyzer 18, the voice packet processor 20, the data packet processor 21 and a transmit packet creating section 31 in order to control communications with electronic apparatus connected via the wireless network. The received data stored in the data buffer 22 is read by the communications controller 23 and analyzed, followed by response processing to the packet.

The communications processor 23 performs various communications controls and transmit power control depending on the content of a packet stored in the data buffer 22. The received data stored in the data buffer 22 is read by the communications controller 23 and analyzed, followed by response processing to the packet.

The voice packet processor 20 separates the voice data stored in the payload as a final section of the SCO packet accommodating the voice data and stores the voice data into a speech buffer 24. The voice packet processor 20 checks the 16-bit CRC code included in the payload. In case an error is found, the voice packet processor 20 reports the error to the error counting section 19. In case an error rate equal to or greater than a threshold set in the voice packet processor 20 is detected, the voice packet processor 20 discards the packet.

The speed buffer which has received the voice data temporarily stores the voice data. The speech buffer comprises at least two speech buffers. In case the handset 6 is in a location where it is communicable with both the second wireless network 4 and the first wireless network 2, the voice data transmitted from the base unit 3 on the first wireless network is stored in one speed buffer while the voice data transmitted from the repeater 5 on the second wireless network is stored in the other speed buffer.

The voice data stored in one buffer of the speech buffer 24 and the voice data from the repeater 5 stored in the other buffer are output to a voice data selector 25. The voice data selector selects either voice data output from one of the speech buffers 24 based on the comparison result from an error comparison section 28 and outputs the selected voice data to a speed decoder 26.

The error counting section 19, receiving an error detection report from the synchronous correlator 17, the received packet analyzer 18, the voice packet processor 20 or the data packet processor 21, stores in which section an error has taken place. That is, an error detected by the synchronous correlator 17 is an access code error, an error detected by the received packet analyzer 18 is a packet head error, and an error detected by the voice packet processor 20 or the data packet processor 21 is a payload error.

The error counting section 19, receiving an error detection report from the synchronous correlator 17, the received packet analyzer 18, the voice packet processor 20 or the data packet processor 21, counts the errors detected by each section and counts the error rate based on the weighting factor specified for each affected section.

A roaming activation setting section 29 stores a threshold of error rate for determining whether to start connection to a new path to another wireless network. When the error rate of the incoming packets from the current distant wireless network has reached or exceeded this threshold, connection to a new path to another wireless network is started. A communications release setting section 30 stores a threshold of error rate used to determine whether the ongoing packet reception from the two wireless networks can be continued. The error comparison section 28 compares the setting in the roaming activation setting section 29 and setting in the communications release setting section 30 based on the result of the error counting section 19 to determine whether to activate roaming or release the ongoing communications.

To be more specific, in case the error rate of the incoming packets from the error counting section 19 indicating the receiving state of the electronic apparatus connected to the distant wireless network has reached or exceeded the threshold in the roaming activation setting section 29, the error comparison section 28 notifies the communications controller 23 that connection to electronic apparatus connected to a separate candidate wireless network should be initiated.

In case the result from the error counting section 19 outputting the error rate of incoming packets from electronic apparatus connected to two wireless networks has reached or exceeded the threshold in the communications release setting section 30, the error comparison section 28 notifies the communications controller 23 that connection to electronic apparatus connected to the wireless network from which incoming packets cannot be received should be released.

As mentioned above, the synchronous correlator 17, the received packet analyzer 18, the voice packet processor 20, the data packet processor 21, error counting section 19, error comparison section 28, the roaming activation setting section 29, and the communications release setting section 30 constitute detection means.

As mentioned earlier, the voice data selector 25 outputs the voice data stored in the speech buffer 24 storing voice data with smaller error rate, based on the report from the error comparison section 28. The speech decoder 26 converts the voice data to an analog signal and output the data as a voice from a loudspeaker 27.

The transmit packet creating section 31 creates a packet based on the output of the speech buffer 35 storing the voice data converted to digital data from the voice input from a microphone 32 via a speech encoder 33, and outputs the packet to the radio section 16.

In case a packet for establishing synchronization or various information is reported, the data created by the communications controller 23 is stored into the data buffer 34 and is transmitted as a packet by the transmit packet creating section from the radio section 16.

The received packet analyzer 18, the voice packet processor 20 or the data packet processor 21, the transmit packet creating section 31, the communications controller 23, the error comparison section 28, the voice data selector 25, and the error counting section 19 may be composed by a gate array, an MPU (Microprocessing Unit), a ROM (Read Only Memory) storing a control program, or a RAM (Random Access Memory) used by a program for data read/write operation.

The speech buffer 24, 35 and the data buffer 22, 34 may be a rewritable SRA (Static Random Access Memory) or DRAM (Dynamic Random Access Memory). The roaming activation setting section 29 and the communications release setting section 30 may be stored in a ROM (Read Only Memory) or in a nonvolatile memory such as a flash memory, an EEPROM (Electrically Erasable Programmable Read-Only Memory) or a battery backup memory.

While the handset 6 as electronic apparatus according to Embodiment 1 of the invention is configured as mentioned above, FIG. 2 does not show, for the sake of convenience, an input section comprising numeric keys for entering a telephone number when placing a call, and a display section comprising an LCD panel for displaying the entered telephone number.

Next, the error detection details and calculation of error rate in the synchronous correlator 17, the received packet analyzer 18, the voice packet processor 20 or the data packet processor 21 will be described based on FIGS. 2 and 3.

Figure 3:
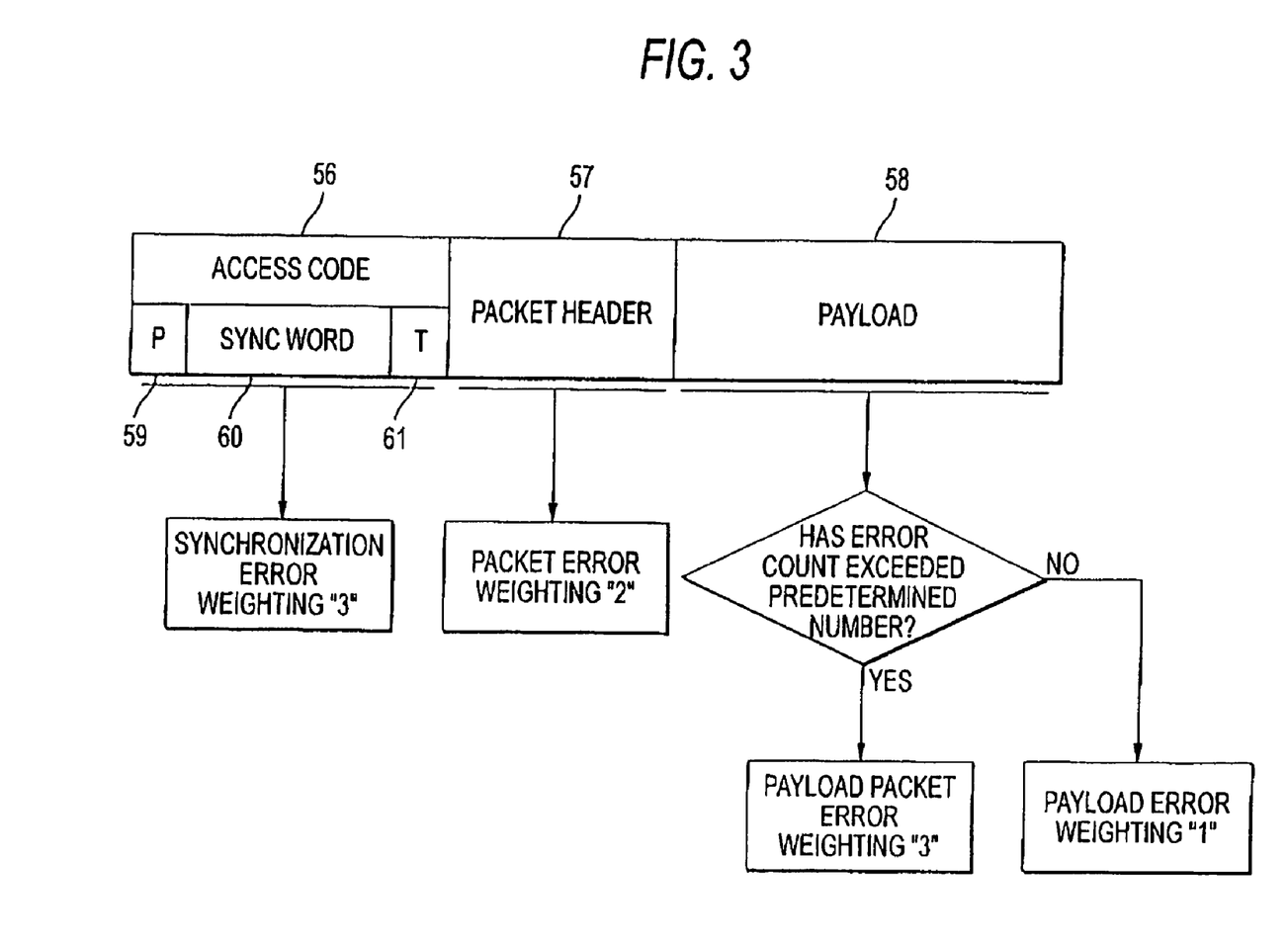
FIG. 3 explains the error detection of the electronic apparatus connectable to the wireless network according to Embodiment 1 of the invention.

FIG. 3 explains the error detection of the electronic apparatus connectable to the wireless network according to Embodiment 1 of the invention. As shown in FIG. 3, a packet 55 has a format conforming to the Bluetooth specifications. The packet 55 comprises three parts, an access code 56 as a top section, a packet header 57 as an intermediate section, and a payload 58 as a final section.

The access code 56 comprises a preamble 59 in the top section of which binary 1s and 0s are repeated over 4 bits, a sync word 60 storing a 64-bit Bluetooth address, and a trailer 61 in the top section of which binary 1s and 0s are repeated over 4 bits, same as the preamble 59. The synchronous correlator 17 detects an error when the access code 56 fails to represent a correct bit string and reports the error to the error counting section 19.

The packet header 57 has 10-bit parameter required to manage communications and an 8-bit CRC code. The received packet analyzer 18 checks the CRC code in the packet hear 57 and in case an error is detected, reports the error to the error counting section 19.

The payload 58 comprises a payload header 8 bits or 16 bits long, a variable-length payload body and a 16-bit CRC code or 60 parity bits. The voice packet processor 20 and the data packet processor 21 checks the CRC code or parity bits and in case an error is detected, reports the error to the error counting section 19.

In case the data stored in the payload 58 is voice data, a data string where one parity bit is added per 4 bits of voice data is formed and stored in the payload. In case the voice data stored in the payload contains errors equal to or greater than a predetermined value (YES), the data packet processor 21 reports a payload packet error to the error counting section 19. In case the voice data stored in the payload contains errors below a predetermined value (NO), the data packet processor 21 reports a payload error to the error counting section 19. The predetermined value is set in the voice packet processor 20.

The error counting section 19 counts an error rate by using a weighting factor for the number of errors. For example, a weighting factor "3" is used for a synchronization error (Sync-Error: $S_{ERR}$) detected by the synchronous correlator 17, "2" for a packer header error (Header-Error: $H_{ERR}$) detected by the received packet analyzer 18, "1" for a payload error (Payload-Error: $P_{ERR}$) detected by the voice packet processor 20 and the data packet processor 21, and "3" for a payload packet error (Payload Packet-Error: $PP_{ERR}$).

Each weighting factor is multiplied by each number of errors for each packet and sum of these values obtained by the error counting section 19 is divided by the number of received packets counted by the error counting section 19 to obtain an error rate. The following shows an expression example:

Error rate=$(S_{ERR} \times 3 + H_{ERR} \times 2 + P_{ERR} \times 1 + PP_{ERR} \times 3)/N$ where V is the number of received packets In this way, by performing weighting depending on the importance of an error location, it is possible to perform operation such as attempting prompt connection to electronic apparatus connected to another wireless network and releasing connection to electronic apparatus connected to a wireless network where an error is detected, once an important packet section has been lost in the ongoing communications. The above weighting is an example and the same weighting factor may be employed irrespective of the error location, by using the same numeric value.

Figure 4:
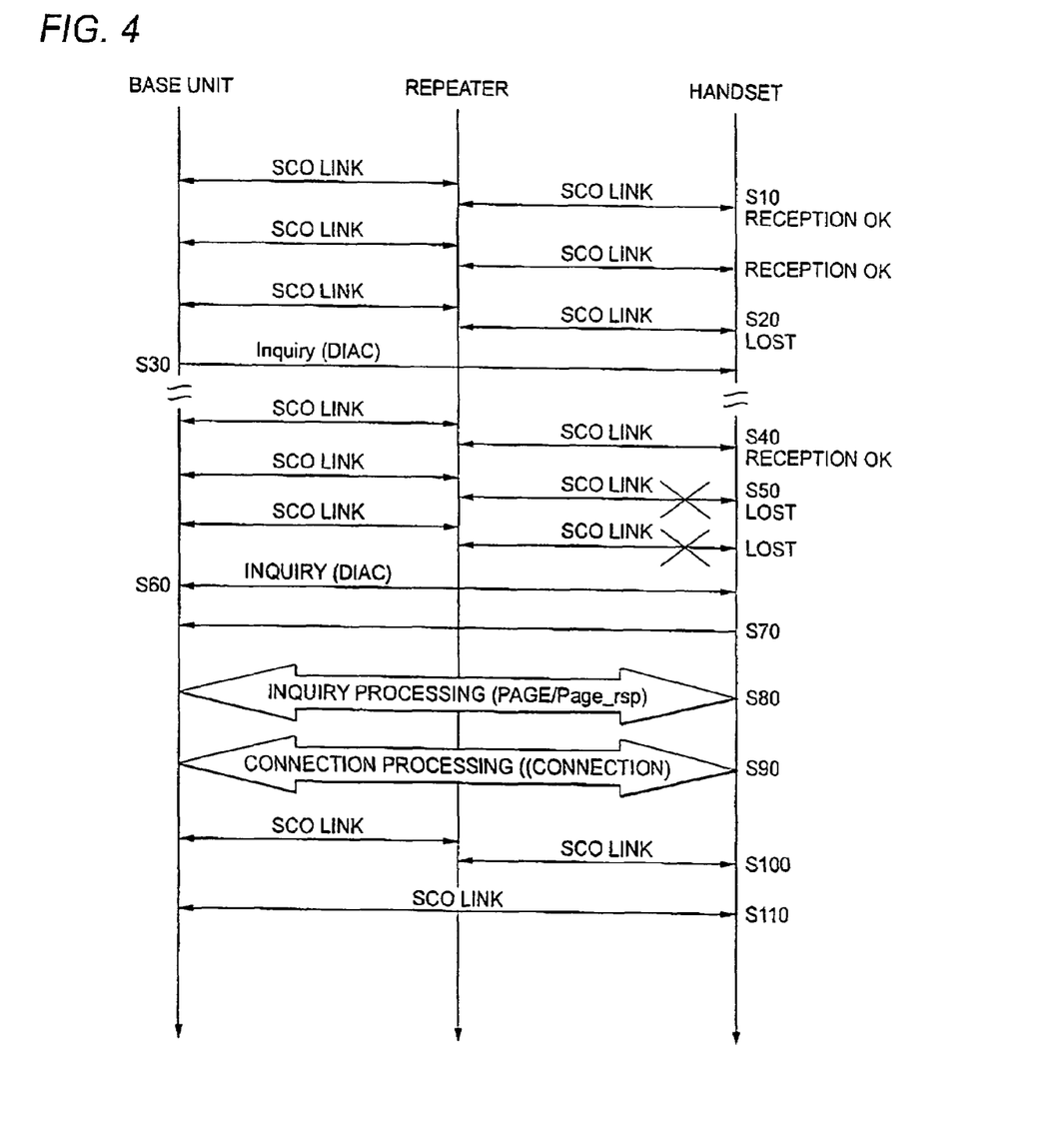
FIG. 4 explains the operation of the electronic apparatus connectable to the wireless network according to Embodiment 1 of the invention.
Figure 6:
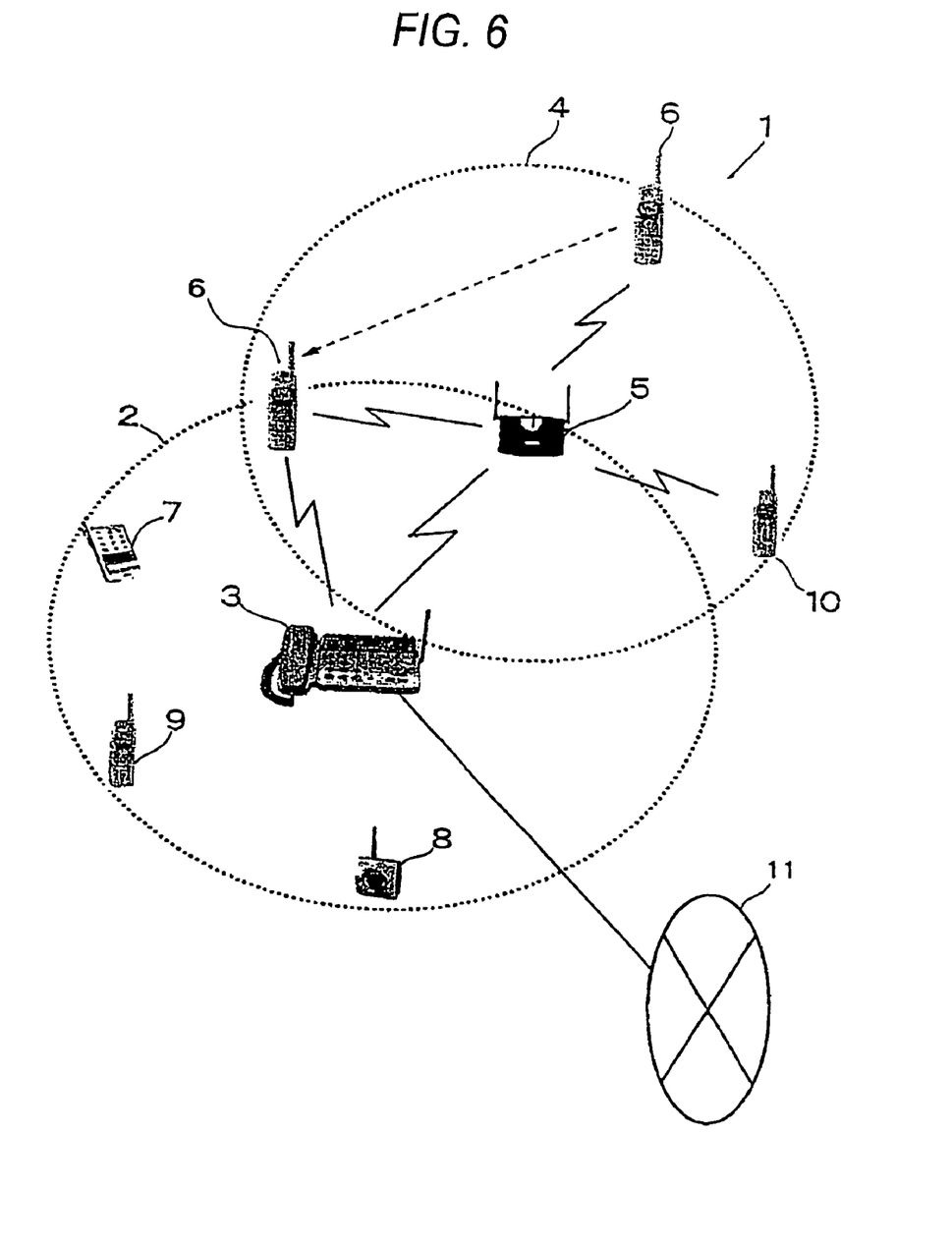
FIG. 6 shows a state where a handset 6 is traveling in the vicinity of the boundary of each of the first wireless network and the second wireless network.
Figure 7:
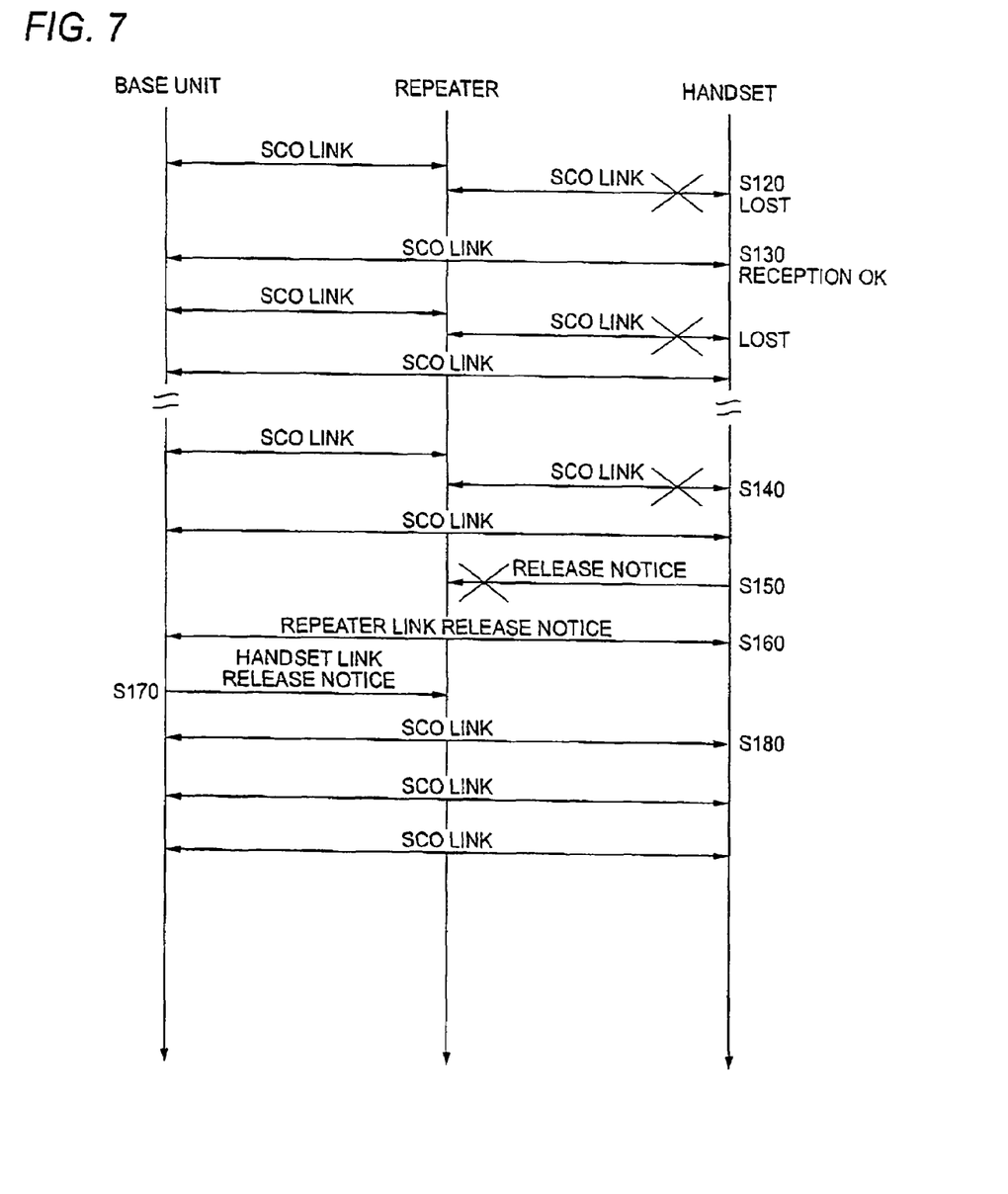
FIG. 7 explains the operation of the electronic apparatus connectable to the wireless network according to Embodiment 1 of the invention.

Operation of the electronic apparatus according to Embodiment 1 of the invention is described below based on FIGS. 1 through 7. FIGS. 4 and 7 explain the operation of the electronic apparatus connectable to the wireless network according to Embodiment 1 of the invention.

FIG. 4 shows a state where a base unit 3 is already connected to a handset 6 via a repeater 5 and communicating voice data with the handset 6. In case voice data transmission from the handset 6, the voice input from the microphone 32 is converted to digital data by the speech encoder 34 and is stored into a speed buffer 35. The voice data is carried by an SCO packet created by a transmit packet creating section 31, which packet is transmitted to the repeater 5 via a radio section 16.

The repeater 5 relays the received SCO packet to the base unit 3. The base unit 3 transmits the voice data of SCO packet received to the PSTN 11 in order to talk with the distant party.

The speed from the distant party is transmitted as an SCO packet from the base unit 3 to the repeater 5, which relays the SCO packet to the handset 6. The handset 6 receives the SOC packet at the radio section 16 via an antenna 15. From the content of the received SCO packet, the synchronous correlator 17 determines that the packet is destined for the handset 6. The received packet analyzer 18 determines that the packet is an SCO packet and outputs the packet to the voice packet processor 20. The synchronous correlator 17, the received packet analyzer 18 and the voice packet processor 20 respectively performs error check of an access code, packet header and payload.

The voice data is stored into a speech buffer 24 and output to a speed decoder 24 via a voice data selector 25, converted to an analog signal, then output as a voice from a loudspeaker 27. In this way, the base unit 3 and the handset 6 communicate with each other via the repeater 5 (S10).

The handset 6 may travel while conversation is under way. Thus, the handset 6 may leave the coverage area of the wireless network 4 formed around the repeater 5 and enter the coverage area of the first wireless network 2. When the handset travels away from the repeaters 5, the received signal level drops although a link is still active between the repeater 5 and the handset 6, so that an SCO packet may be undelivered (S20). The link is not released even when an SCO packet is undelivered. In this stage, a link based on SCO packets is active between the base unit 3 and the repeater 5 so that communications are possible.

From the base unit 3, an Inquiry packet (IQ packet) as a packet to inquire whether apparatus to be periodically connected is present in the first wireless network 2 is transmitted. The handset 6 neglects the Inquiry packet from the base unit 3 as long as the link between the handset and the repeater 5 is active (S30). In case the handset 6 is located in the vicinity of the boundary of the second wireless network 4, an SCO packet may be occasionally delivered (S40).

As the handset 6 gradually leaves the coverage of the repeater 5, synchronization errors, packet header errors, payload errors or payload packet errors tend to occur more frequently (S50).

The error counting section 19 of the handset 6 calculates the error rate while weighting the error count depending on the error location. When the error comparison section 28 determines that the error rate has reached or exceeded the threshold in the roaming activation setting section 29, the error comparison section 28 notifies the communications controller 23 that it should receive and respond to an Inquiry packet from the base unit 3 connected to the first wireless network 2 and establish a connection (S60).

The communications controller 23 responds to the Inquiry packet from the base unit 3 and transmits an Inquiry#rsp packet (S70). Thereafter the communications controller 23 follows the procedure conforming to the Bluetooth specifications to make an inquiry (S80) and establishes a connection (S90).

In this way, while the handset 6 is engaged in conversation while traveling, as long as the handset is located in a place where connections to the first wireless network 2 and the second wireless network 4 are available, connections to these two wireless networks are provided at the same time in case one of the connections is in poor condition, thereby allowing an SCO packet to be delivered on any path to maintain conversation. S100 shows a state where the handset 6 and the repeater 5 are connected. S110 shows a state where handset 6 and the base unit 3 are connected.

Figure 5:
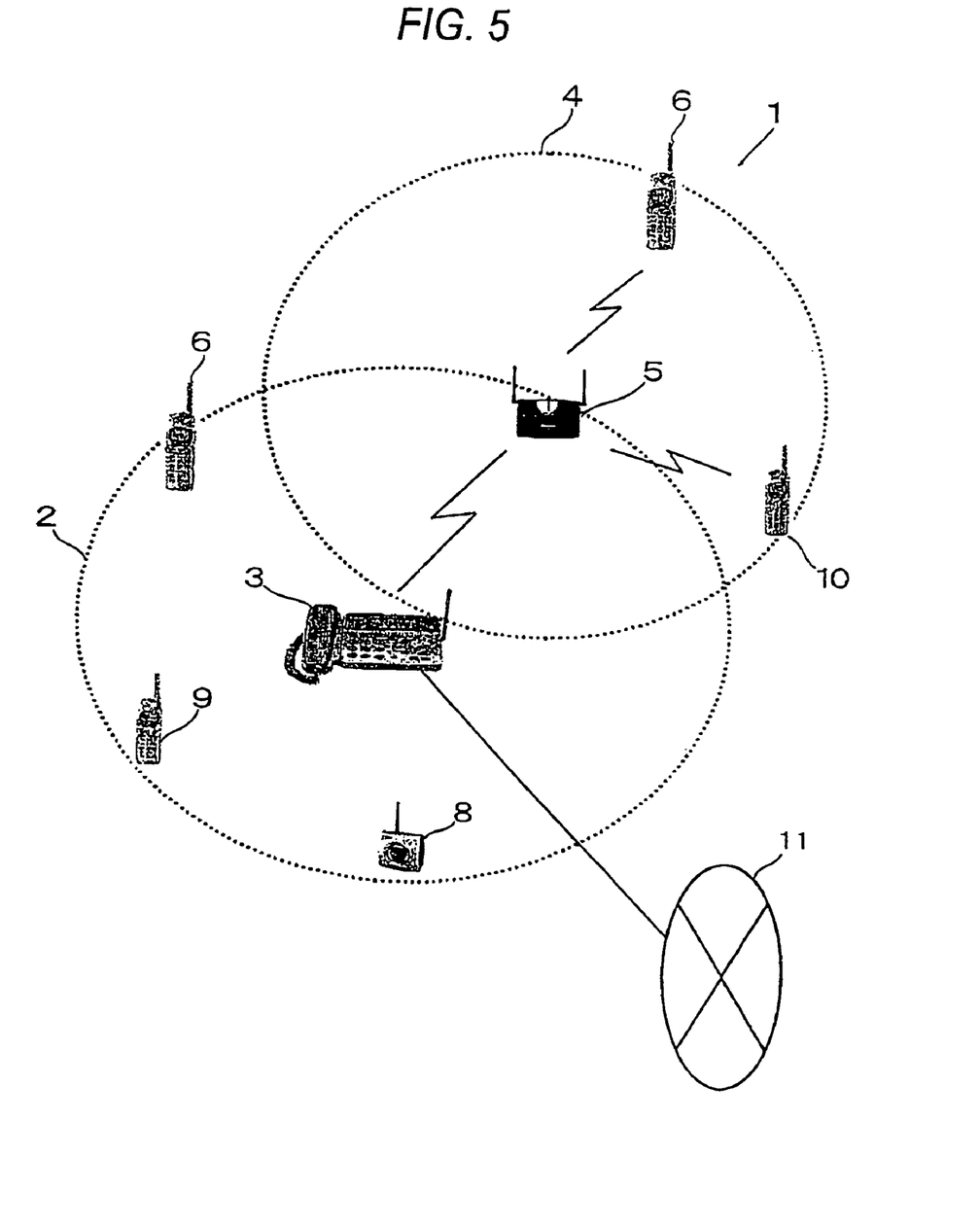
FIG. 5 shows a state where a handset has entered the coverage area of a first wireless network out of a second wireless network in the wireless network system according to an embodiment of the invention.

FIG. 5 shows a state where a handset has entered the coverage area of a first wireless network 2 out of a second wireless network 4. When the handset has entered the coverage area of the first wireless network 2 out of the second wireless network 4, an SCO packet destined for the handset 6 from the repeater 5 is undelivered although an SCO packet from the base unit 3 is delivered to the handset 6 so that communications are available.

In this way, as the handset 6 travels, the distance between the handset 6 and the repeater 5 increases and synchronization errors, packet head errors, payload errors or payload packet errors take place in an SCO packet transmitted from the repeater 5 t the handset 6 (S120).

The voice data of an SCO packet from the repeater 5 which could be received irrespective of an error contained therein is stored into the speech buffer 24. The voice data of an SCO packet from the base unit 3 is also stored into the speech buffer 24 and output to the voice data selector 25.

The error counting section 19 reports the error ratio of SCO packets stored in each first wireless network 24 to the first wireless network 28. As a result, the voice data of a lower error rate stored in the first wireless network 24 is determined. The first wireless network 25 selects the output of the first wireless network 28 which has stored the voice data of a lower error rate and outputs the voice data based on a notice from the first wireless network 28. In this case, the SCO packets from the base unit 3 connected to the first wireless network 2 has a lower error rate so that the voice data of the SCO packets from the base unit 3 is selected and output to the first wireless network 26 (S130).

When SCO packets from the repeater 5 has numerous errors and in case the error counting section 19 has detected that the error rate output from the error counting section 19 has reached or exceeded the threshold specified in the communications release setting section 30, the error counting section 19 notifies that communications controller that it should release the link to the repeater 5 and maintain the connection link to the base unit 3 alone.

The communications controller 23 transmits a connection link release notice to the repeater 5 and transmits to the base unit 3 a notice to release a link to the repeater 5 (S150, S160). In this case, the notice to release a link to the repeater 5 is undelivered (S150) and the link release notice to the repeater 5 is delivered to the base unit 3. In accordance with the connection link release notice from the handset, the communications controller 23 of the base unit 3 notifies the repeater 5 that a connection link release notice is received from the handset 6 (S170).

In this way, the repeater 5 is notified via the base unit 3 that the communications with the handset 6 is no more available. The repeater 5 can thus release the link to the handset 6 now unavailable. This assures a reliable wireless network.

Thereafter, the handset 6 transmits/receives SCO packets to/from the base unit 3 alone (S180) and performs communications within the coverage area of the first wireless network 2.

Figure 8:
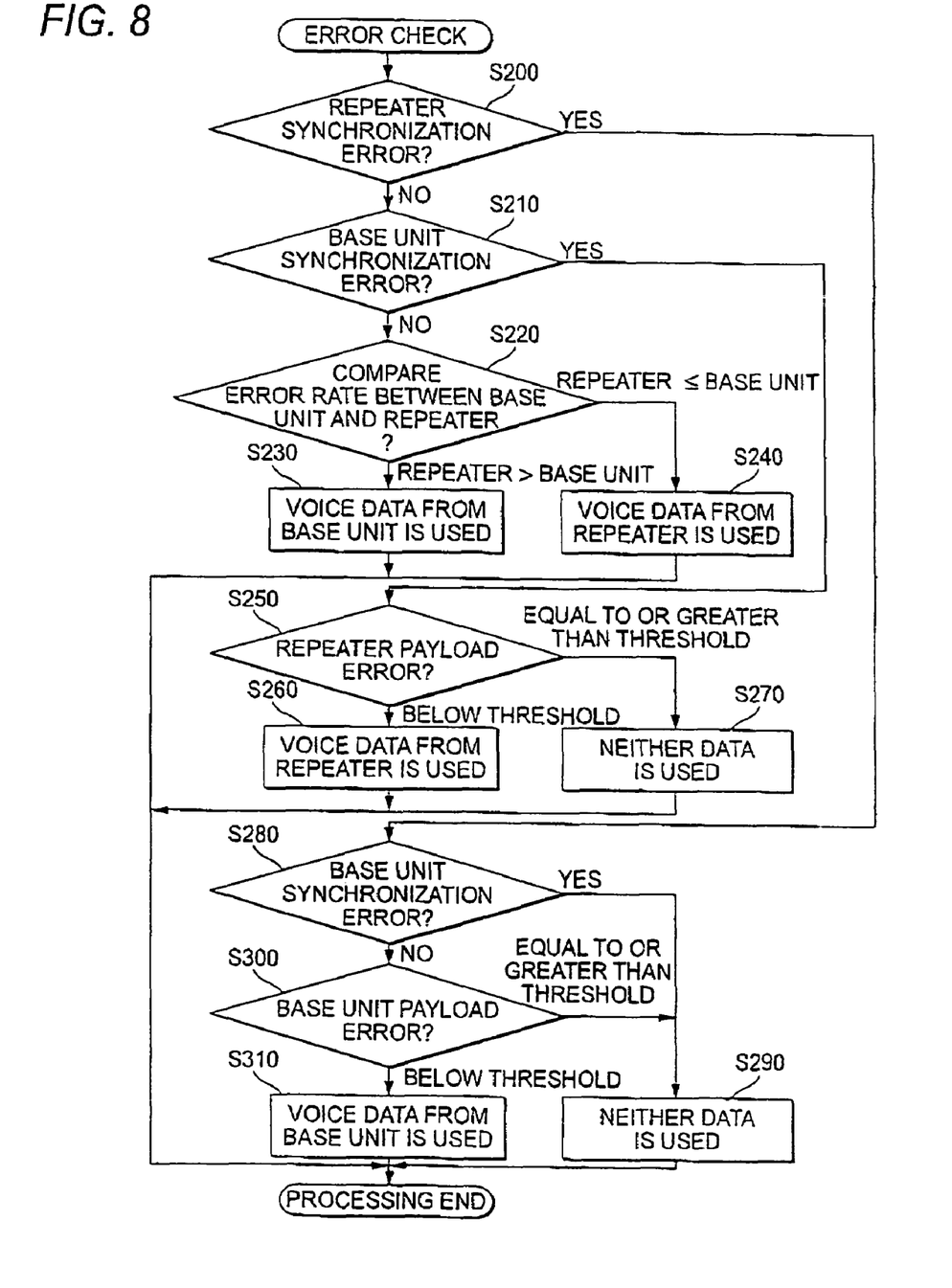
FIG. 8 shows the error detection operation of a handset of the cordless phone as an example of electronic apparatus connectable to the wireless network according to Embodiment 1 of the invention.

Next, various types of error detecting operation of the handset 6 will be detailed based on FIGS. 1 through 3 and FIG. 8. FIG. 6 shows a state where a handset 6 is traveling in the vicinity of the boundary of each of the first wireless network 2 and the second wireless network 4. FIG. 8 shows the error detection operation of a handset of the cordless phone as an example of electronic apparatus connectable to the wireless network according to Embodiment 1 of the invention.

As shown in FIG. 6, in case the handset 6 is traveling in the vicinity of the boundary of each of the first wireless network 2 and the second wireless network 4, packets are received from both the base unit 3 on the first wireless network 2 and the repeater 5 on the second wireless network 4.

As shown in FIG. 8, when the handset 6 receives a packet from the repeater 5, the synchronous correlator 17 checks the access code 56 of the packet and detects a synchronization error. In case a synchronization error is not detected, execution proceeds to S210.

In S210, the synchronous correlator 17 checks the access code 56 of the packet from the base unit 3 to detect a synchronization error. In case a synchronization error is not detected, execution proceeds to S220.

In S220, the voice packet processor 20 checks the payload 58 of a packet received from the repeater 5 and the base unit 3. In case it has detected a payload error, the voice packet processor 20 reports the error to the error counting section 19 and calculates the error rate of the repeater 5 and the base unit 3. When the error rate is reported from the error counting section 19 to the first wireless network 28, the error rate of the base unit 3 and that of the repeater 5 are compared with each other.

In case the repeater 5 has an error rate equal to or lower than that of the base unit 3, the first wireless network 28 notifies the first wireless network 25 in S230 that it should use the voice data of a packet from the repeater 5.

In case the repeater 5 has an error rate higher than that of the base unit 3, the first wireless network 28 notifies the first wireless network 25 in S240 that it should use the voice data of a packet from the base unit 3.

In case a synchronization error is detected in the access code 56 of a packet from the base unit 3 in S210, the voice packet processor 20 determines in S250 whether the error rate of the payload error of a packet from the repeater 5 exceeds the threshold set in the voice packet processor 20.

In case the error count of a packet from the repeater 5 is below the threshold, the voice packet processor 20 selects and uses in S260 the speech buffer 20 storing the voice data of a packet from the repeater 5.

In case the error count of a packet from the repeater 5 has reached or exceeded the threshold, the voice packet processor 20 discards in S270 the packet from the repeater 5. Neither the voice packets from the repeater 5 nor those from the base unit 3 are used.

In case the synchronous correlator 17 detects a synchronization error in the access code 56 of a packer from the repeater 5 in S200, the synchronous correlator 17 checks the access code 56 of a packet from the base unit 3 to detect a synchronization error. In case a synchronization error is detected, execution proceeds to S290.

A synchronization error is detected in both packets from the repeater 5 and the base unit 3, so that the packets from the repeater 5 and those from the base unit 3 are not used and discarded.

In case In case a synchronization error is not detected in S280, the voice packet processor 20 detects a payload error of a packet from the repeater 5 in S300 to determine whether the error count exceeds the threshold set in the voice packet processor 20.

In case the error count of a packet from the base unit 3 is below the threshold, the voice packet processor 20 stores the voice data of a packet from the base unit 3 into the speech buffer 24 in S310 and the first wireless network 28 notifies the voice data selector 25 that it should use the voice data of a packet from the base unit 3.

In case the error count of a packet from the base unit 3 has reached or exceeded the threshold, the voice packet processor 20 discards in S290 the packet from the base unit 3. Neither the voice packets from the repeater 5 nor those from the base unit 3 are used.

In this way, in case the handset 6 roams from the second wireless network 4 to the first network 2, it is possible to receive packets from the base unit 3 on the first wireless network 2 even when the speech quality is gradually degraded and more errors are detected in the received data, thereby using the voice data of a lower error rate and providing a wireless network system featuring a high speech quality and a high reliability.

Embodiment 2

Embodiment 2 of the invention will be described based on FIGS. 9 and 10. This embodiment is an example where the invention is applied to the base unit of a cordless phone. FIG.

9 shows an example of a wireless network system according to Embodiment 2 of the invention. FIG. 10 shows the structure of the base unit of a cordless phone as an example of electronic apparatus connectable to a wireless network according to Embodiment 2 of the invention. In FIG. 9, a first wireless network 2 is formed around a base unit 42 and a second wireless network 4 is formed by a repeater 5 as repeating apparatus and handsets 6 of a cordless phone. The second wireless network 42 of the first wireless network performs communications following the procedure conforming to the Bluetooth standard. Embodiment 2 of the invention is arranged so that the second wireless network 42 will receive an SCO packet as voice data from both wireless networks and use the voice data of a lower error rate.

Figure 9:
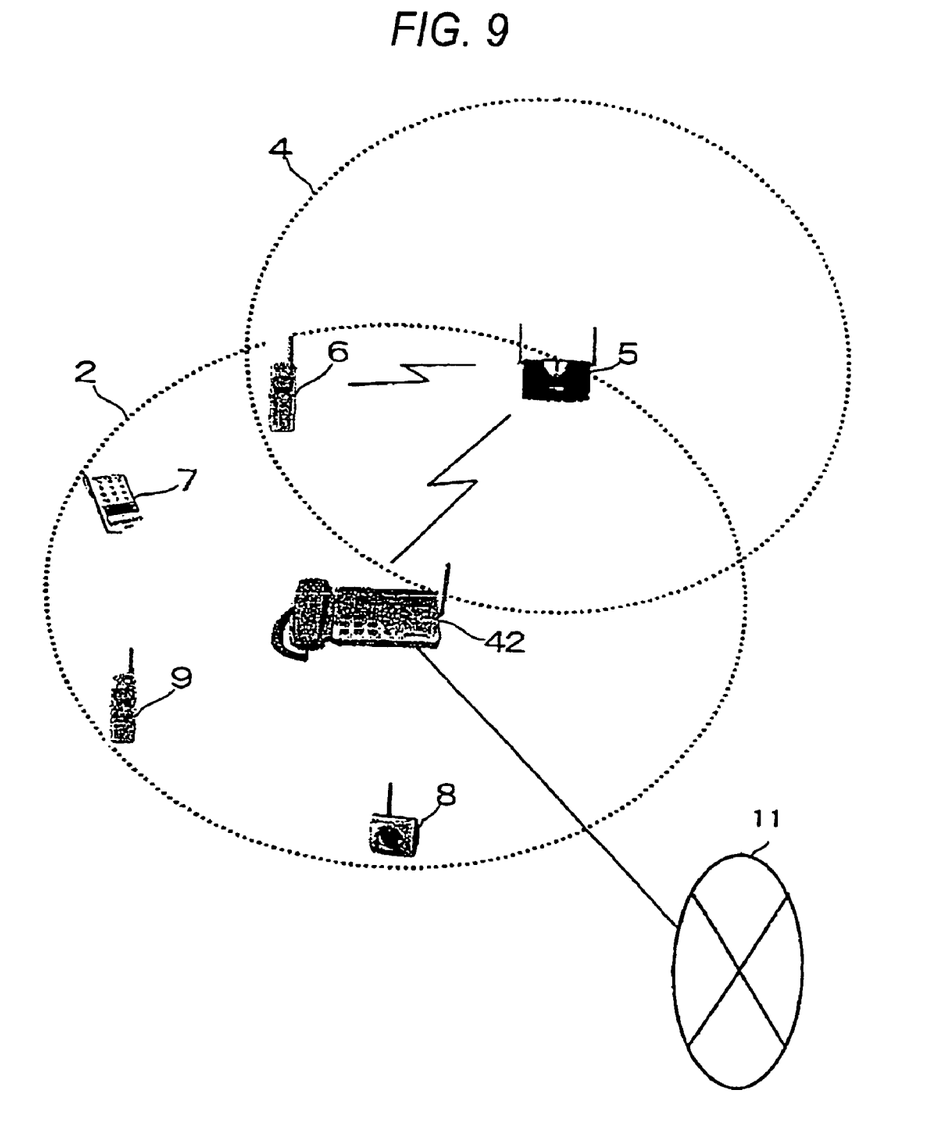
FIG. 9 shows an example of a wireless network system according to Embodiment 2 of the invention.

A PDA 7, a digital camera 8 and a handset 9 on the first wireless network in FIG. 9 are similar to those in FIG. 1, so that the same signs/numerals are assigned and corresponding description is omitted. A repeater 5 and a handset 6 on the second wireless network 4 are similar to those in FIG. 1 so that the same signs/numerals are assigned and corresponding description is omitted. It is assumed that the handset 6 is in a position where it can be connected to both the first wireless network 2 and the second wireless network 4.

Figure 2:
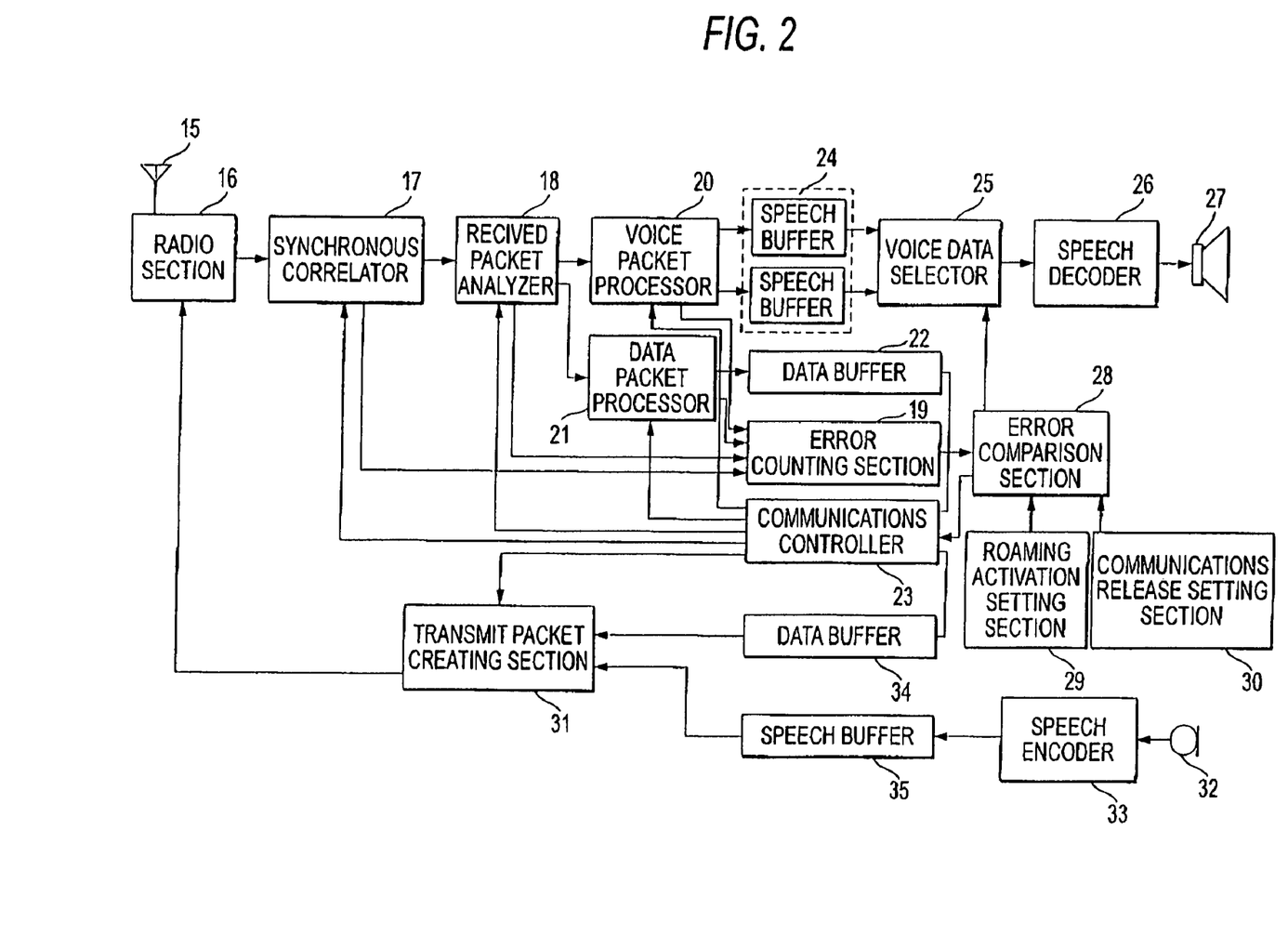
FIG. 2 is a block diagram of a cordless phone as an example of electronic apparatus connectable to the wireless network according to Embodiment 1 of the invention.
Figure 10:
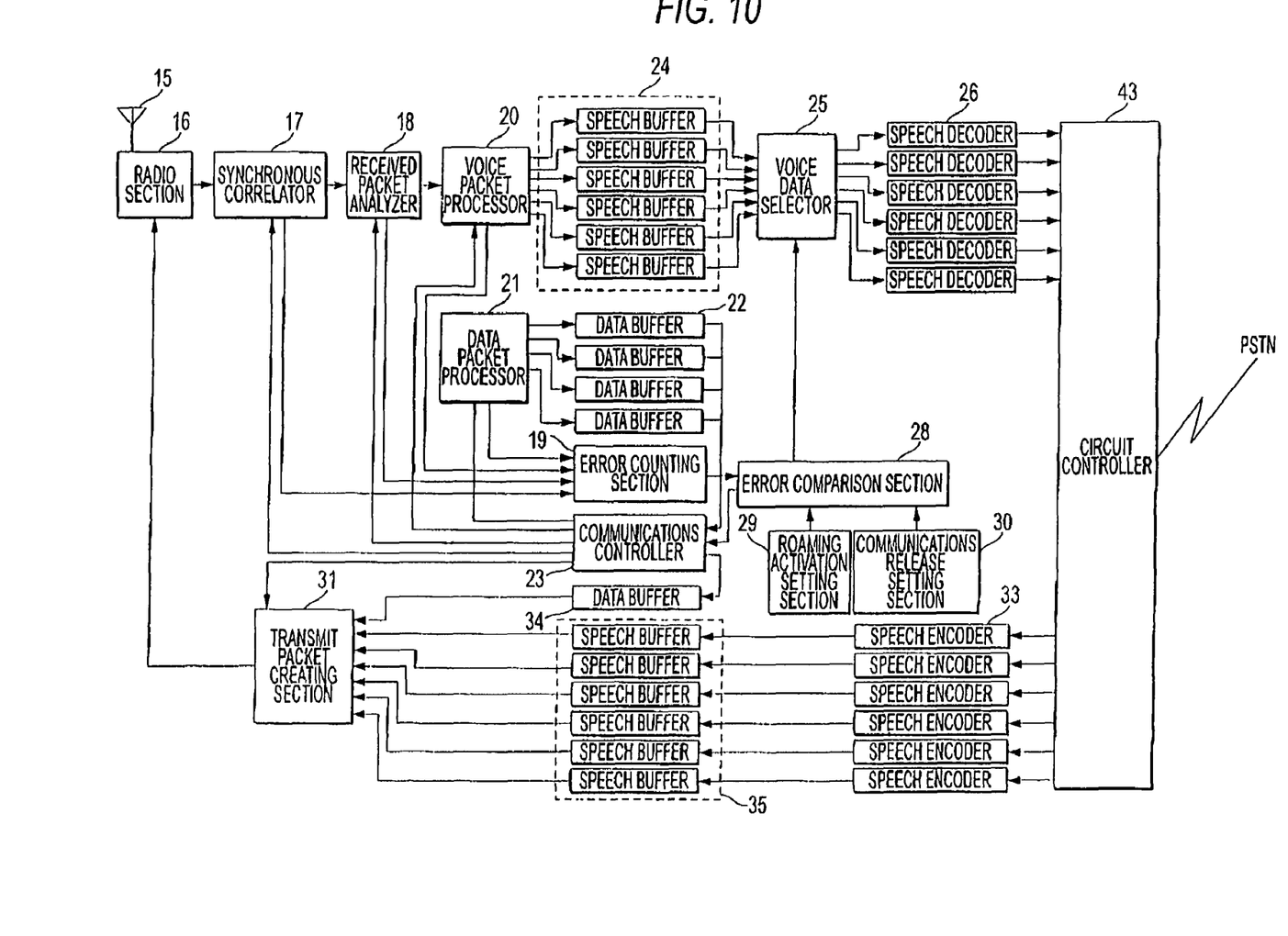
FIG. 10 explains the configuration of a base unit of a cordless phone as an example of electronic apparatus connectable to the wireless network according to Embodiment 2 of the invention.

As shown in FIG. 10, an antenna 15, a radio section 16, a synchronous correlator 17, a received packet analyzer 18, an error counting section 19, a voice packet processor 20, a data packet processor 21, a communications controller 23, a transmit packet creating section 31, a speech buffer 24, 35, a data buffer 22, 34, a voice data selector 25, a roaming activation setting section 29, and a communications release setting section 30 have the same features as those in FIG. 2. Thus the same signs/numerals are assigned and corresponding description is omitted.

As shown in FIG. 9, the base unit 42 of the cordless phone is connected to a PSTN 11. A circuit controller 43 is provided for transmitting to the PSTN 11 the output of a speed decoder 26 which outputs the digital voice data to an analog signal and for outputting the analog voice data received from the PSTN 11 to a speed encoder for conversion to a digital signal.

The base unit 42 comprises six speech buffers 24 for storing voice data received from a handset or other apparatus and six speech buffers 35 for storing voice data to be transmitted to a handset or other apparatus. The base unit 42 comprises six speech decoders for data reception from a handset in correspondence with the six speech buffers 24 and six speech decoders for data transmission to a handset in correspondence with the six speech buffers 35 in order to make available simultaneous connection to six handsets in regular use (not via the repeater 5).

In case voice data is directly received from the handset 6 and receiving the voice data from the handset 6 via the repeater 5 at the same time, the base unit 42 uses two speech buffers out of the plurality of speech buffers 24. For example, in case a handset has entered the second wireless network 4 while roaming from the coverage area of the first wireless network 2, the speech quality between the base unit 42 and the handset is gradually degraded and errors increases in number. This increase in the number of errors is used as a trigger to start connection to the repeater 5 while maintaining data reception from the handset. The base unit 42 uses two speech buffers to store both the voice data directly received from the handset 6 and voice data received from the same handset 6 via the repeater 5. Based on a notice from the error comparison section 28, the voice data selector 25 outputs to the speech decoder 26 the voice data stored in the speed buffer storing voice data of a lower error rate. The speech decoder 26 converts the voice data to an analog signal and outputs the signal to the circuit controller 43.

As mentioned above, in case the handset 6 as a distant party is in a position where it can be directly connected (first wireless network 2) and also connected via the repeater 5 (second wireless network 4), the base unit 42 stores the voice data received over respective paths into two speech buffers individually and uses the voice data of a lower error rate. When direct connection from the handset 6 is no longer available, only the connection via the repeater is used so as to provide a wireless network system with high speech quality and high reliability.

In case data is received from a plurality of handsets directly or via the repeater 5, two speech buffers are used per handset, so that simultaneous connection with total three handsets is allowed. For data communications except voice data, the base unit 42 comprises four reception data buffers 22 and one transmission data buffer 34.

With this configuration of the second wireless network 42, in case the handset 6 has traveled from the coverage area of the first wireless network 2 to the second wireless network 4 while the handset 6 is directly communicating with the base unit 42, the second wireless network 42 starts connection to the repeater 5 while maintaining reception from the handset 6, and once the direct connection from the handset 6 is no longer available, only the connection via the repeater is used so as to seamlessly switch to the connection via the repeater 5.

Embodiment 3

Figure 11:
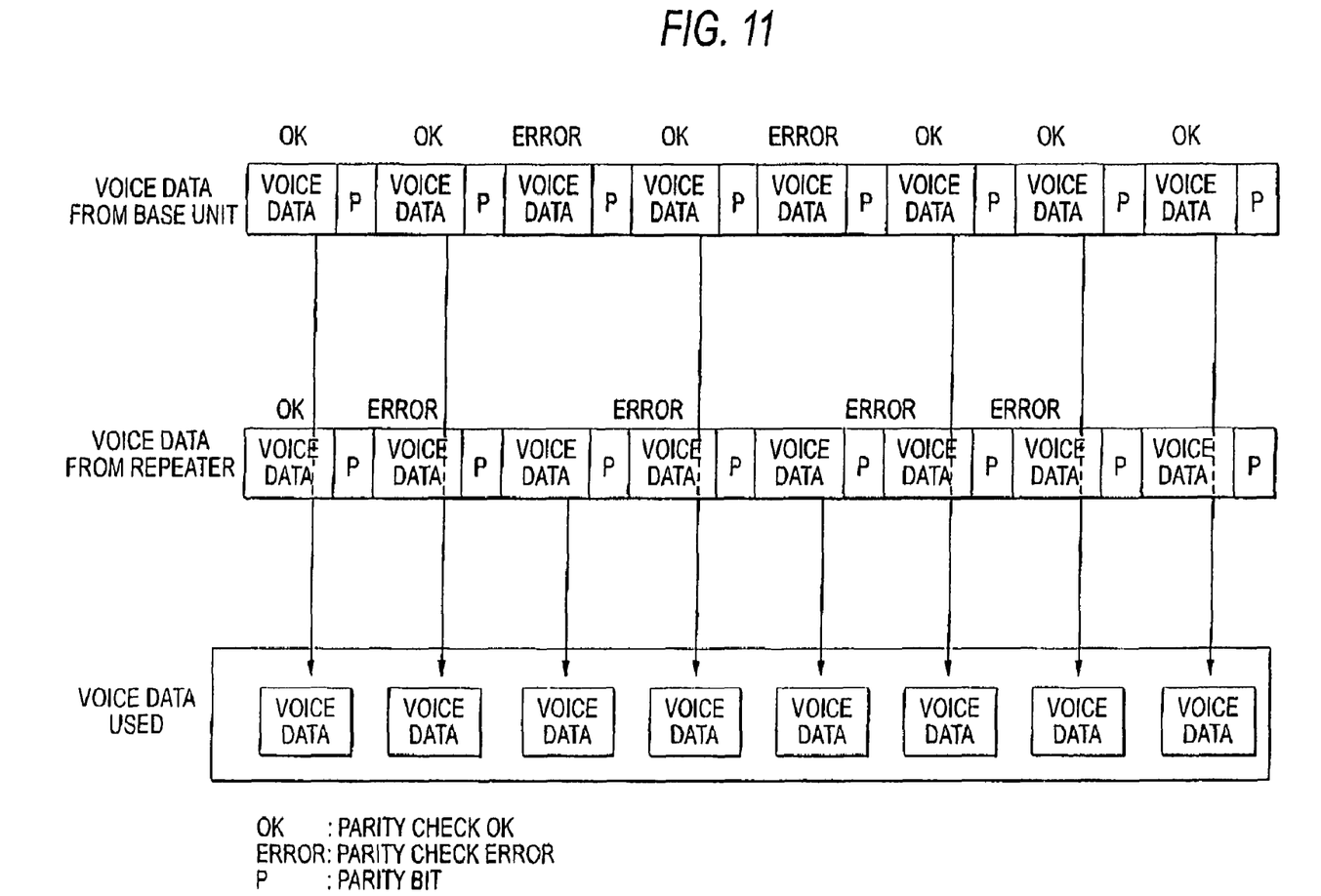
FIG. 11 explains the error control of a handset of a cordless phone as an example of electronic apparatus connectable to the wireless network according to Embodiment 3 of the invention, where sections of voice data without errors are extracted/selected and used.

Electronic apparatus connectable to a wireless network according to Embodiment 3 of the invention and a wireless network system comprising the electronic apparatus is described below based on FIGS. 1, 2 and 11. FIG. 11 explains the error control of a handset of a cordless phone as an example of electronic apparatus connectable to the wireless network according to Embodiment 3 of the invention, where sections of voice data without errors are extracted/selected and used.

The handset of a cordless phone according to Embodiment 3 of the invention is designed to extract the error-free section of the voice data from a base unit and a repeater and select the voice data therein, in case signals from both the base unit of the cordless phone and the repeater can be received.

As shown in FIGS. 2 and 11, voice data has one parity bit per four bits of data. The voice packet processor 20 performs error check by using the parity bits of the voice packet.

When the voice packet processor 20 detects a payload error in a packet, the first wireless network 20 reports the error to the first wireless network 28 via the error counting section 19. The first wireless network 28 notifies the first wireless network 25 that it should select voice data as received data in a section having no errors.

In this way, by using error-free voice data in the payload of a voice packet from the repeater 5 and the base unit 3, quality voice communications are made available.

This application is based upon and claims the benefit of priority of Japanese Patent Application No. 2003-401263 filed on Dec. 1, 2003, the contents of which are incorporated herein by reference in its entirety.

The invention claimed is:

1. An electronic apparatus connectable to a plurality of wireless networks, said electronic apparatus comprising:
 a radio section for directly communicating with a first electronic apparatus which belongs to a first wireless network or for communicating with said first electronic apparatus via a second electronic apparatus which belongs to a second wireless network, said second electronic apparatus performing data relay between said first wireless network and said second wireless network;

an error detector for detecting an error of first data received directly from said first electronic apparatus or for detecting an error of second data received from said first electronic apparatus via said second electronic apparatus; and a selector for selecting data from said first data or said second data depending on a result detected by said error detector, wherein:

when an error rate detected by said error detector has reached or exceeded a predetermined value while communicating with an electronic apparatus which belongs to one of said first wireless network and said second wireless network, said radio section starts communications over a path which belongs to the other wireless network.

2. The electronic apparatus according to claim 1, wherein said selector makes partial selection from said respectively received data based on said error detected by said error detector.

3. The electronic apparatus according to claim 1, further comprising:

at least two buffers for temporarily storing said received data, wherein:

said electronic apparatus stores said first data directly received from said first electronic apparatus into a first buffer and stores said second data received via said second electronic apparatus into a second buffer when said electronic apparatus is in a position to communicate with said first electronic apparatus and said second electronic apparatus, and said electronic apparatus reads and reproduces data from either said first buffer or said second buffer selected based on said error rate detected by said error detector.

4. The electronic apparatus according to claim 3, wherein when said error rate detected by said error detector has reached or exceeded a predetermined value while communicating with one of said first electronic apparatus and said second electronic apparatus, said radio section releases a connection with said one of said first electronic apparatus and said second electronic apparatus.

5. An electronic apparatus connectable to a plurality of wireless networks, said electronic apparatus comprising:

a communicator for communicating with another electronic apparatus directly or via a repeater;

an error detector for detecting an error of first data received directly from said other electronic apparatus or for detecting an error of second data received from said other electronic apparatus via said repeater;

a selector for selecting data from said first data or said second data depending on the result detected by said error detector;

a controller, when said electronic apparatus is in a position where said electronic apparatus is communicable with said first electronic apparatus and said second electronic apparatus, for outputting a voice based on said selected data; and at least two buffers for temporarily storing the received data, wherein:

said electronic apparatus stores the data directly received from said first electronic apparatus into one buffer and stores the data received via said second electronic apparatus into the other buffer respectively, and when the electronic apparatus is in a position where the electronic apparatus is communicable with said first electronic apparatus and said second electronic apparatus, said electronic apparatus reads and reproduces data from a buffer selected based on the error rate detected by said detection means.

6. The electronic apparatus according to claim 5, wherein said communicator starts one communication of communication with said other electronic apparatus directly and communication with said other electronic apparatus via said repeater and said communicator stops said communication with said other electronic apparatus directly and communication with said other electronic apparatus via said repeater when an error rate detected by said error detector has reached or exceeded a predetermined value.

7. The electronic apparatus according to claim 5, wherein said communicator releases communication where an error rate detected by said error detector has reached or exceeded the a predetermined value.

8. The electronic apparatus according to claim 5, wherein said error detector calculates an error rate based on a weighting factor which depends on an error location in said first data and said second data.

9. A wireless network system comprising:

a first electronic apparatus connected to a first wireless network and connectable to a second wireless network;

a second electronic apparatus connected to said second wireless network and connectable to said first wireless network, said second electronic apparatus performing data relay between said first wireless network and said second wireless network; and a third electronic apparatus connected to said first wireless network and said second wireless network, said third electronic apparatus comprising a calculator for calculating an error rate of data received from said first electronic apparatus and said second electronic apparatus; wherein:

said third electronic apparatus has a feature to transmit to said first electronic apparatus a release notice indicating that communications with said second electronic apparatus is unavailable in case said error rate of said data received from said electronic apparatus has reached or exceeded a predetermined value, and said first electronic apparatus has a feature to transmit a release notice to said second electronic apparatus in case a release notice is received from said third electronic apparatus.

10. An electronic apparatus connectable to a plurality of wireless networks, said electronic apparatus comprising:

a radio section (I) for directly communicating with a first electronic apparatus which belongs to a first wireless network, receiving first data from said first electric apparatus and outputting said first data, or (ii) for communicating with said first electronic apparatus via a second electronic apparatus which belongs to a second wireless network, receiving second data from said second electric apparatus and outputting said second data, said second electronic apparatus performing data relay between said first wireless network and said second wireless network;

an error counter for counting the number of errors of first data outputted from said radio section; and a selector for selecting data from said first data or said second data, wherein when said number of errors has reached or exceeded a predetermined value while communicating with said first electronic apparatus, said selector selects said second data and said radio section starts communicating with said second apparatus.

11. The electronic apparatus according to claim 10, wherein:

said error counter counts another number of errors of second data outputted from said radio section, and when said other number of errors has reached or exceeded a predetermined value while communicating with said second electronic apparatus, said selector selects said first data and said radio section starts communications with said first apparatus.

* * * * *